(12) United States Patent
Rooney

(10) Patent No.: US 8,165,992 B2
(45) Date of Patent: Apr. 24, 2012

(54) SYSTEM AND METHOD FOR TRACKING NOTIFICATIONS IN A PUBLISH SUBSCRIBE SYSTEM

(75) Inventor: Sean G. Rooney, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 121 days.

(21) Appl. No.: 11/943,567

(22) Filed: Nov. 20, 2007

(65) Prior Publication Data

US 2008/0082562 A1   Apr. 3, 2008

Related U.S. Application Data

(63) Continuation of application No. 10/981,184, filed on Nov. 4, 2004, now abandoned.

(51) Int. Cl.
*G06F 17/30* (2006.01)
(52) U.S. Cl. ......................................................... 707/627
(58) Field of Classification Search .................. 707/627
See application file for complete search history.

(56) References Cited

U.S. PATENT DOCUMENTS

| | | | | |
|---|---|---|---|---|
| 4,020,473 | A * | 4/1977 | Fujimura | 1/1 |
| 5,887,243 | A * | 3/1999 | Harvey et al. | 725/136 |
| 5,919,247 | A * | 7/1999 | Van Hoff et al. | 709/217 |
| 6,173,191 | B1 * | 1/2001 | Jennings, III | 455/562.1 |
| 6,256,664 | B1 * | 7/2001 | Donoho et al. | 709/204 |
| 6,256,676 | B1 * | 7/2001 | Taylor et al. | 709/246 |
| 6,272,536 | B1 * | 8/2001 | van Hoff et al. | 709/217 |
| 6,438,361 | B1 * | 8/2002 | Chong et al. | 455/188.1 |
| 6,466,937 | B1 * | 10/2002 | Fascenda | 707/10 |
| 6,643,650 | B1 * | 11/2003 | Slaughter et al. | 707/10 |
| 6,735,630 | B1 * | 5/2004 | Gelvin et al. | 709/224 |
| 6,738,975 | B1 * | 5/2004 | Yee et al. | 719/310 |
| 6,789,126 | B1 * | 9/2004 | Saulpaugh et al. | 709/245 |
| 6,807,558 | B1 * | 10/2004 | Hassett et al. | 709/203 |
| 6,816,862 | B2 * | 11/2004 | Mulgund et al. | 707/10 |
| 6,819,669 | B2 * | 11/2004 | Rooney | 370/390 |
| 6,826,607 | B1 * | 11/2004 | Gelvin et al. | 709/224 |
| 6,832,251 | B1 * | 12/2004 | Gelvin et al. | 709/224 |
| 6,834,195 | B2 * | 12/2004 | Brandenberg et al. | 455/456.3 |

(Continued)

OTHER PUBLICATIONS

Cugola, G. and Jacobsen, H. 2002. Using publish/subscribe middleware for mobile systems. SIGMOBILE Mob. Comput. Commun. Rev. 6, 4 (Oct. 2002), 25-33. DOI= http://doi.acm.org/10.1145/643550.643552.*

(Continued)

*Primary Examiner* — Mark Andrwe X Radtke
(74) *Attorney, Agent, or Firm* — Whitham, Curtis, Christofferson & Cook, P.C.; Daniel P. Morris

(57) ABSTRACT

A system and method are provided for tracking notification messages from a message publisher to a message subscriber. The system includes a plurality of entities that are operatively coupled to one another via an electronic network, and each entity includes at least one processor configured as a message publisher, a channel and/or a message subscriber. According to the invention, at least one entity is configured as a channel, which is assigned to the function of acting as a meta-channel and comprises (i) means for receiving one or more channel descriptions; and (ii) means for publishing a digest of one or more channel descriptions and/or message transformations to facilitate tracking of message transformations from raw forms to processed forms. The system may have more than one meta-channel, and the meta-channels may subscribe to or publish to each other.

17 Claims, 4 Drawing Sheets

U.S. PATENT DOCUMENTS

| | | | |
|---|---|---|---|
| 6,850,252 B1* | 2/2005 | Hoffberg | 715/716 |
| 6,859,831 B1* | 2/2005 | Gelvin et al. | 709/224 |
| 6,862,500 B2* | 3/2005 | Tzamaloukas | 701/1 |
| 6,925,378 B2* | 8/2005 | Tzamaloukas | 701/200 |
| 6,950,875 B1* | 9/2005 | Slaughter et al. | 709/230 |
| 7,019,637 B1* | 3/2006 | Johnson et al. | 340/531 |
| 7,020,701 B1* | 3/2006 | Gelvin et al. | 709/224 |
| 7,031,945 B1* | 4/2006 | Donner | 705/64 |
| 7,076,365 B2* | 7/2006 | Tzamaloukas | 701/217 |
| 7,085,814 B1* | 8/2006 | Gandhi et al. | 709/208 |
| 7,130,885 B2* | 10/2006 | Chandra et al. | 709/206 |
| 7,143,123 B2* | 11/2006 | Tom et al. | 1/1 |
| 7,162,454 B1* | 1/2007 | Donner et al. | 705/64 |
| 7,171,475 B2* | 1/2007 | Weisman et al. | 709/227 |
| 7,171,487 B2* | 1/2007 | Herkersdorf et al. | 709/238 |
| 7,177,881 B2* | 2/2007 | Schwesig et al. | 707/104.1 |
| 7,188,026 B2* | 3/2007 | Tzamaloukas | 701/200 |
| 7,188,106 B2* | 3/2007 | Dwork et al. | 707/5 |
| 7,190,678 B2* | 3/2007 | Thubert et al. | 370/254 |
| 7,194,756 B2* | 3/2007 | Addington et al. | 725/116 |
| 7,233,948 B1* | 6/2007 | Shamoon et al. | 707/9 |
| 7,248,841 B2* | 7/2007 | Agee et al. | 455/101 |
| 7,305,084 B2* | 12/2007 | Hawkes et al. | 380/37 |
| 7,340,214 B1* | 3/2008 | Hamberg | 455/41.2 |
| 7,406,647 B2* | 7/2008 | Lakkis | 714/758 |
| 7,412,518 B1* | 8/2008 | Duigou et al. | 709/227 |
| 7,421,411 B2* | 9/2008 | Kontio et al. | 705/52 |
| 7,430,257 B1* | 9/2008 | Shattil | 375/347 |
| 7,519,726 B2* | 4/2009 | Palliyil et al. | 709/232 |
| 7,561,544 B2* | 7/2009 | Ganesh | 370/328 |
| 7,590,098 B2* | 9/2009 | Ganesh | 370/338 |
| 7,594,002 B1* | 9/2009 | Thorpe et al. | 709/219 |
| 7,606,939 B1* | 10/2009 | Finn | 709/246 |
| 7,630,336 B2* | 12/2009 | Ganesh | 370/328 |
| 7,664,080 B2* | 2/2010 | Ganesh | 370/338 |
| 2002/0012322 A1* | 1/2002 | Rooney | 370/252 |
| 2002/0069294 A1* | 6/2002 | Herkersdorf et al. | 709/238 |
| 2002/0191769 A1* | 12/2002 | Duponchel et al. | 379/219 |
| 2003/0037074 A1* | 2/2003 | Dwork et al. | 707/500 |
| 2004/0001498 A1* | 1/2004 | Chen et al. | 370/401 |
| 2004/0002967 A1* | 1/2004 | Rosenblum et al. | 707/3 |
| 2004/0019783 A1* | 1/2004 | Hawkes et al. | 713/161 |
| 2004/0076155 A1* | 4/2004 | Yajnik et al. | 370/389 |
| 2004/0239681 A1* | 12/2004 | Robotham et al. | 345/581 |
| 2008/0313282 A1* | 12/2008 | Warila et al. | 709/206 |

OTHER PUBLICATIONS

Mobile Applications with a Middleware System in Publish-Subscribe Paradigm. 2003. E Yoneki. Available online at http://grids.ucs.indiana.edu/ptliupages/hhms/pdf/MobileApplPubSub2003.pdf.*

Toh, C. 1997. Associativity-Based Routing for Ad Hoc Mobile Networks. Wirel. Pers. Commun. 4, 2 (Mar. 1997), 103-139. DOI=http://dx.doi.org/10.1023/A:1008812928561.*

* cited by examiner

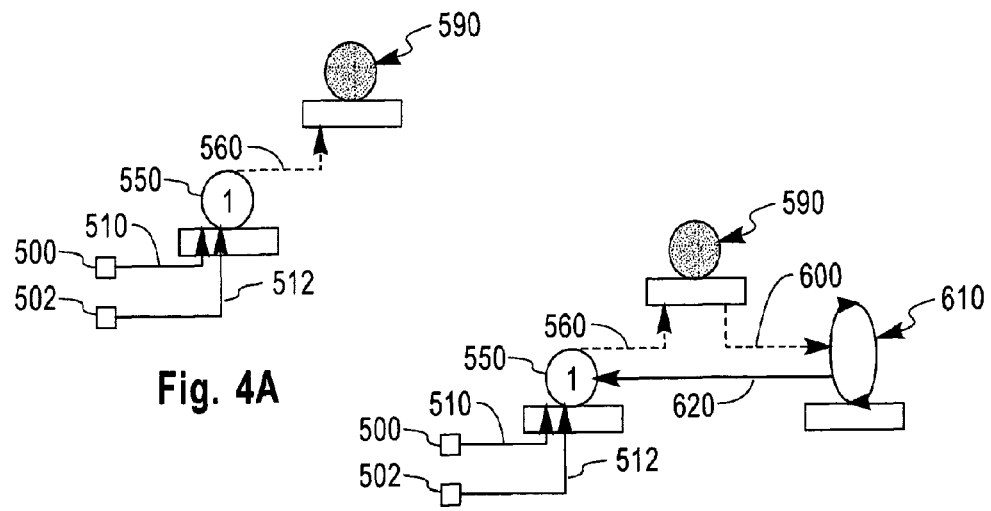
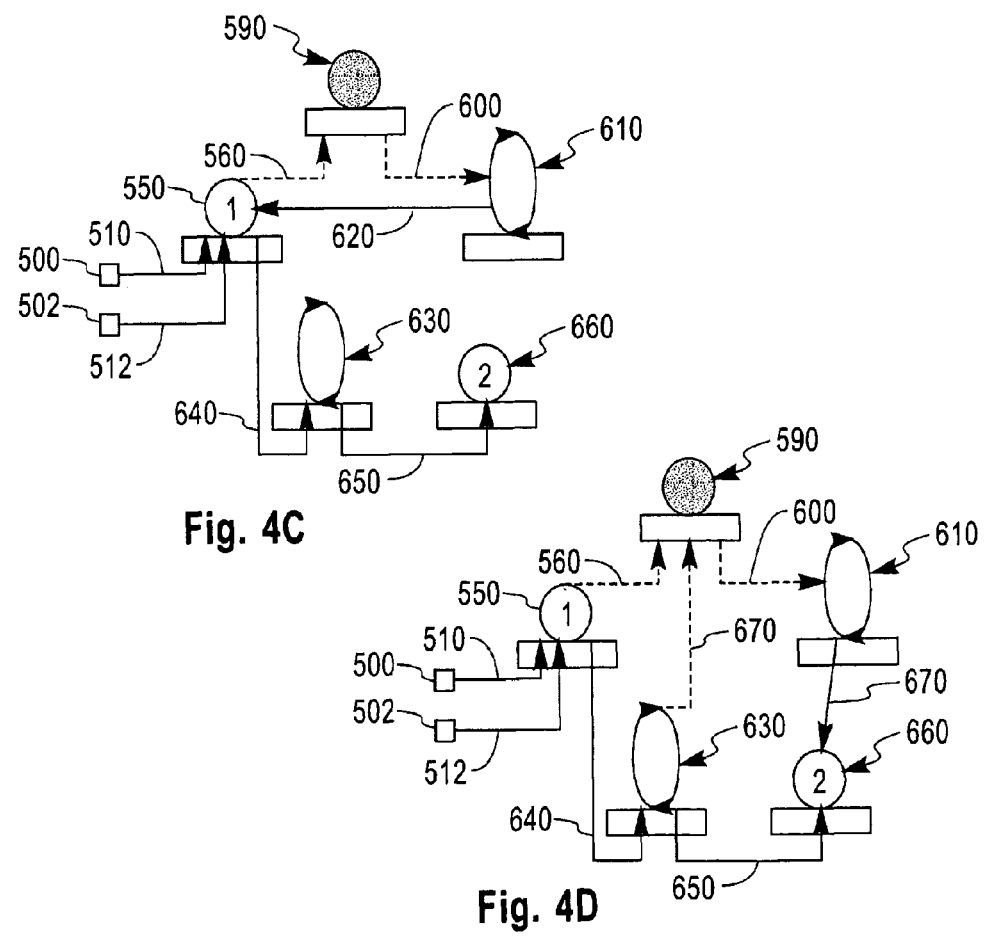
Fig. 4A
Fig. 4B
Fig. 4C
Fig. 4D

SYSTEM AND METHOD FOR TRACKING NOTIFICATIONS IN A PUBLISH SUBSCRIBE SYSTEM

This application is a continuation of parent application Ser. No. 10/981,184 filed Nov. 4, 2004, now abandoned which is incorporated herein by reference. The present invention relates to publish/subscribe systems, and more particularly to a system for tracking notifications in a publish/subscribe system.

TECHNICAL FIELD AND BACKGROUND OF THE INVENTION

The publish/subscribe communication paradigm describes a known form of interaction in distributed computing settings. In a publish/subscribe system, a subscriber may register interest in or subscribe to events pertaining to a given topic; thereafter, the subscriber receives notifications of such events, which are produced by publishers.

In a publish/subscribe system, publishers or senders of data do not communicate directly with subscribers or receivers; instead, publishers and subscribers interact through an intermediate entity referred to here as a channel, but also known in the art by various other names, such as notification server, broker or event service. Publishers may publish notifications about the occurrence of the events on a channel by first marking these notifications with a particular topic. Subscribers receive notifications in the form of the messages from the channel for events that conform to the topic(s) in which they have registered interest. Since message producers (publishers) and consumers (subscribers) communicate indirectly with each other via a channel, message transmission is decoupled from message reception. As a consequence, neither producers nor consumers need to maintain state about each other, and dependencies between the interacting participants are reduced or eliminated. The publish/subscribe scheme is therefore more flexible than other communication paradigms, such as point-to-point messaging, because publishers and subscribers can be started and stopped asynchronously.

The publish/subscribe mechanism is well suited to messaging systems in which many sensors monitor the dynamically changing state of some underlying system and forward measurement data to a central server site. The central server site, which receives the measurement data, typically employs an application server that processes the information, stores it in a database, and provides an interface to an application user. As processors become more and more inexpensive, and as advances are made in wireless communication, many simple sensors may be added to existing systems in order to enhance monitoring and management thereof. The sensors produce notifications about changes in state of the underlying system and therefore are modeled as publishers of particular types of events or topics. Sensors, in this context, are modeled as publishers of particular types of events or topics, and the systems that monitor the events are modeled as subscribers. Here, the term "event" refers to a change in state in the underlying system.

In a sensor network, sensors inform the application server about the occurrence of events through notification messages. Large, distributed systems may have many, many sensors, and the frequency at which they send notifications may be very high. For example, in an application that uses RFID tags to follow the movement of products in a supermarket, if every article pickup in every supermarket in a chain of stores is sent as a notification to the supermarket chain's back-end server, then the volume of notifications could rise to tens of thousands per second. Thus, an application server can become overloaded if every notification is delivered to it.

To reduce the load on the application server, an architectural entity may be placed between the sensors and the application server. This entity is termed an edge server, as it is logically located at the edge of the network. Edge servers pre-process raw sensor data and may aggregate information to enable certain sensor applications to be scalable. Thus, edge servers may intercept notifications, process them and send aggregations or summaries of the information they contain to the application server.

Edge servers subscribe to channels on a given topic and may publish messages to application code on a potentially different channel on the same or a different topic. An application server or edge server "wants" to receive only the most condensed or aggregated form of a notification from a sensor; that is, there is no advantage in receiving both the "raw" notification and a summary of the many raw notifications in which it is included.

An edge server based architecture nevertheless raises a number of technical challenges. For one thing, deploying large numbers of edge servers means that failures of parts of the system typically occur so frequently that failure is the norm rather than the exception. This problem is exacerbated by the fact that edge servers often execute in a more hostile and less well-protected environment than application servers, in the sense that edge servers are typically deployed out "in the field" and are not as easily protected as within large, centralized server farms. In such cases, the failure of an edge server that normally collects data from many publishers (such as sensors or other edge servers) is problematic: in the absence of a means for the publishers to learn that they should now publish messages elsewhere, the data will typically be lost.

Challenges are also posed by the communication requirements from sensors to edge servers, edge servers to edge servers, and edge servers to application server. Messages sent by sensors are typically transmitted over wireless links. The messaging system therefore needs to take into account the particularities of wireless communication, i.e., (i) that bandwidth is typically less abundant than in a fixed network; and (ii) that wireless communication is more subject to noise and interruption. Since a message generated by an edge server is typically the result of a pre-processing step, the information content is higher and consequently is more valuable than the messages produced by the sensors and must be better protected from loss. In addition, the application server typically employs a messaging system that is rich with functionality and follows certain standards. As a consequence, several different messaging systems with potentially a large number of independent channels are required if edge servers are to be deployed in a large, distributed sensor network.

A further challenge posed by known messaging systems is that the administration of the entire system becomes more complex with an edge server-based architecture. If a large number of edge servers are deployed, it is extremely difficult to configure each of them manually, so that all entities know to which channels they should subscribe and to which they should publish. Known systems are also difficult to reconfigure as loads change, or as edge servers or channels are stopped and started.

The Applicant therefore believes that there is a need for more resilient and scalable tracking of notifications in publish/subscribe systems.

OBJECTS AND ADVANTAGES OF THE INVENTION

The present invention improves on the prior art and eliminates many problems associated with the prior art including, but not limited to, those previously discussed above. Objects and advantages of the invention are achieved by the features of the claims set forth below.

According to a first aspect of the invention, there is provided a method for tracking notification messages from a message publisher to a message subscriber, in a publish/subscribe system having one or more entities each configured as a message publisher, a channel and/or a message subscriber wherein the method comprises subscribing to a channel that describes the behavior of other channels in the system (from hereon referred to as a meta-channel); and receiving a digest of channel descriptions and/or transformation descriptions from the meta-channel to facilitate tracking of message transformations from raw forms to more processed forms. Messages or message descriptions in raw form may comprise raw data that has been collected or detected by an entity in the system such as a sensor, which may publish the raw data to another entity. Message transformations in more processed forms may comprise messages or message descriptions including data from a number of other entities that has been aggregated or including data from one or more entities that has been enriched or transformed in some way, depending on the application.

The method of the invention may enable one of the entities to subscribe to a first channel in response to tracking certain message transformations. A subscription to a second channel may be dropped in response to determining that the first channel publishes one or more messages in a more processed form. Furthermore, the method may include publishing aggregated or transformed messages. Preferably, the control messages that are published on the meta-channel are formatted in accordance with XML specifications.

The method of the invention makes use of channel descriptions that describe channels and/or meta-channels. Information in the channel descriptions may be used in a manner that improves the resiliency and/or responsiveness of the system in which the invention operates. For example, if the load on the channel or meta-channel is communicated in the channel description the method enables an entity to discriminate between channels offering similar functionality in order to determine where to publish or subscribe, particularly if one of the channels is overloaded. Channel descriptions may also include information on the refresh rate or refresh period corresponding to the time between publications of a channel description. A channel or meta-channel may use the refresh rate to determine if another entity has stopped functioning, particularly upon nonreception of a channel description after a sufficiently long period compared to the refresh period. The meta-channel's refresh period may also be published to the channels it controls, whereupon the method of the invention adjusts the refresh period for the channels, thereby controlling the load on the meta-channel.

In another aspect of the invention, a publish/subscribe system is provided for tracking notification messages from a message publisher to a message subscriber. The system includes a plurality of entities that are operatively coupled to one another via an electronic network, and each entity includes at least one processor configured as a message publisher, a channel and/or a message subscriber. In the inventive system, at least one entity is configured as a channel, which is assigned to the function of acting as a meta-channel and comprises (i) means for receiving one or more channel descriptions or transformation descriptions; and (ii) means for publishing a digest of channel descriptions or transformation descriptions to facilitate tracking of message transformations from raw forms to processed forms. The system may have more than one meta-channel, and the meta-channels may subscribe to or publish to each other.

According to a further aspect of the invention, an apparatus is provided for tracking notification messages from a message publisher to a message subscriber, wherein the apparatus comprises at least one processor operative to: (i) subscribe to a first message publisher to receive a digest of channel descriptions; and (ii) determine whether a second message publisher publishes one or more notifications in an aggregated form. If the second message publisher publishes the one or more notifications in a more aggregated form, the processor is operative to subscribe to the second message publisher.

The present invention may be implemented in a variety of ways, as those who are skilled in the art will recognize. It will find particular application in distributed data processing system that uses publication/subscribe messaging. Furthermore, as described in further detail below, and with reference to the accompanying drawings, the invention enables entities within a messaging system to dynamically track notifications in order to receive the most aggregated form of a notification. Thus, the invention achieves both resiliency and scalability, particularly for applications and processors that operate within a large distributed system.

DESCRIPTION OF THE DRAWINGS

FIGS. 4A, 4B, 4C and 4D illustrate schematically how message transformations are tracked according to a preferred embodiment of the invention.

DETAILED DESCRIPTION OF PREFERRED EMBODIMENTS

The following detailed description is intended to provide an example of the invention wherein a distributed messaging system uses sensors to monitor events and forward event data to a server. It is to be appreciated, however, that this description should not be taken to limit the scope of the invention to messaging systems that use sensors. More generally, the invention may be implemented in any distributed messaging system wherein processors publish notifications to notification receivers.

According to a preferred embodiment, the invention may be used in a distributed system wherein sensors are employed to monitor the state of an underlying system and forward measurement data to a central server. Example applications of such a messaging system include flood warning applications that monitor water levels in water ways, inventory management applications that track the location and number of goods using radio frequency identification (RFID), or automotive traffic warning schemes that monitor the behavior of vehicles in order to detect and predict congestion.

The invention may be implemented in a messaging system that uses sensors which may be very limited in their ability to learn about where they should publish their messages or to learn about the evolution of the messaging system as channels move, fail, get switched off, are re-configured, etc. The sensors, for example, may execute in an environment in which they cannot be externally powered. They may depend on internal batteries and may have to be very simple to reduce their power consumption. They may have the capability to communicate among themselves or to subscribe to a channel to learn about where they should publish their messages, or, alternatively, they may simply broadcast or transmit messages to a preconfigured destination.

Figure 1:
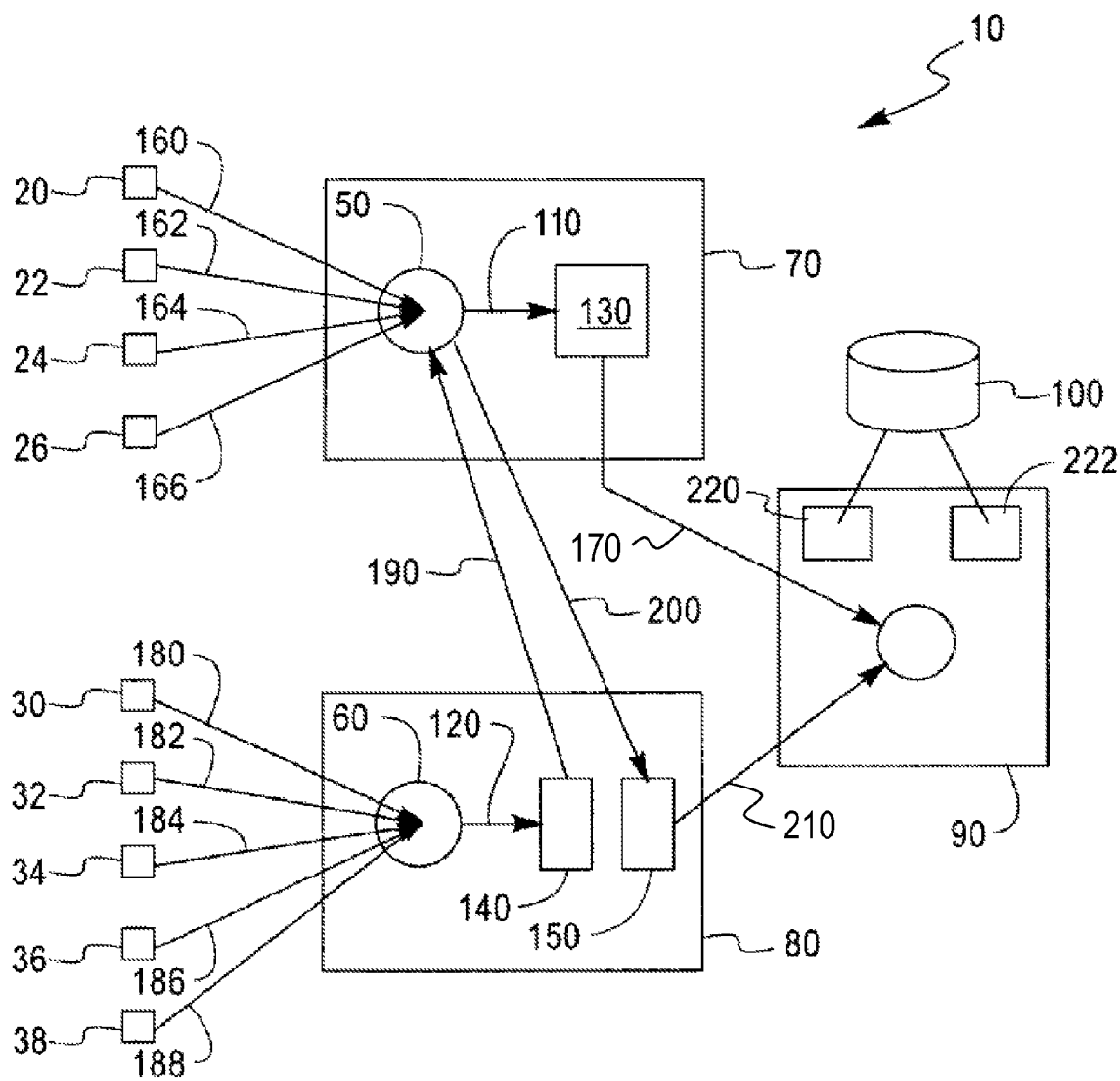
FIG. 1 is a block diagram of a distributed information handling system capable of implementing the present invention.

Referring to FIG. 1, a block diagram is shown of a distributed system 10 within which the automated notification tracking system of the invention may be implemented. The distributed system 10 preferably includes sensors 20-38, data channels 50, 60, edge servers 70, 80, application server 90 and database 100. Sensors 20-44, edge servers 70, 80 and application servers 90 communicate through one or more messaging channels using one or more different technologies. Event data may be gathered by sensors 20-38 and forwarded to channels 50, 60, each of which preferably supports a publish/subscribe mode of interaction. Channels 50, 60 may publish messages 110, 120 about the events to application code 130, 140, 150 running on edge servers 70, 80, which are intermediate computation platforms in which data may be processed, filtered and/or reformatted before arriving at an ultimate destination.

Application code 130, 140, 150 running on an edge server 70, 80 may read from one or more channels 50, 60, process the messages, and transform, enrich or aggregate the data received in the message(s). Thus, edge servers 70, 80 preferably perform at least some preprocessing of raw data before forwarding messages in more processed forms toward an application server 90. For example, as illustrated in FIG. 1, sensors (e.g., 20-26) send messages (160-166) to a channel 50 on edge server 70, wherein application code 130 runs on edge server 70, reads messages 110 from channel 50 and writes processed messages 170 to an application server 90. Similarly, sensors 30-38 send messages 180-188 to a second channel 60 on a second edge server 80 on which application code 140, 150 resides. Application code 130 may process messages 110, 190 that are received from both channel 50 and second channel 60 and may then publish aggregated or transformed messages 200 to the second channel 60. Application code 150 on the second channel 60 may process messages 120 and/or further process messages 200 received at the second edge server 80 and may then write processed messages 210 to software components such as message beans 220, 222 running on application server 90.

Depending on the application, it may be preferable to use pipelined processing such that multiple stages of edge servers process message data and then forward messages pertaining to the processed data to an application server. The application server 90 comprises a software platform that may run over one or more machines. The main application runs on the application server 90, which may interact with end users.

A channel (e.g., 50) may run on an edge server 70 as illustrated in FIG. 1 or may be supported by an application server (e.g., 90) or even by a sensor (e.g. 20). Data channels 50, 60 may be supported by different messaging technologies known by those of ordinary skill in the art, such as for example the IBM® WebSphere® MQSeries® middleware system or the CORBA® (Common Object Request Broker Architecture) Notification Service. IBM, WebSphere and MQSeries are trademarks of International Business Machines Corporation in the United States, other countries, or both. CORBA is a trademark of Object Management Group, Inc. in the United States and/or other countries. CORBA refers to a suite of specifications issued by the Object Management Group, Inc. (OMG), for an architecture and infrastructure that computer applications use to work together over networks. The OMG maintains the specifications along with other current documentation at their web site, http://www.omg.org. It is anticipated that the specifications for CORBA will develop over time.

Figure 2:
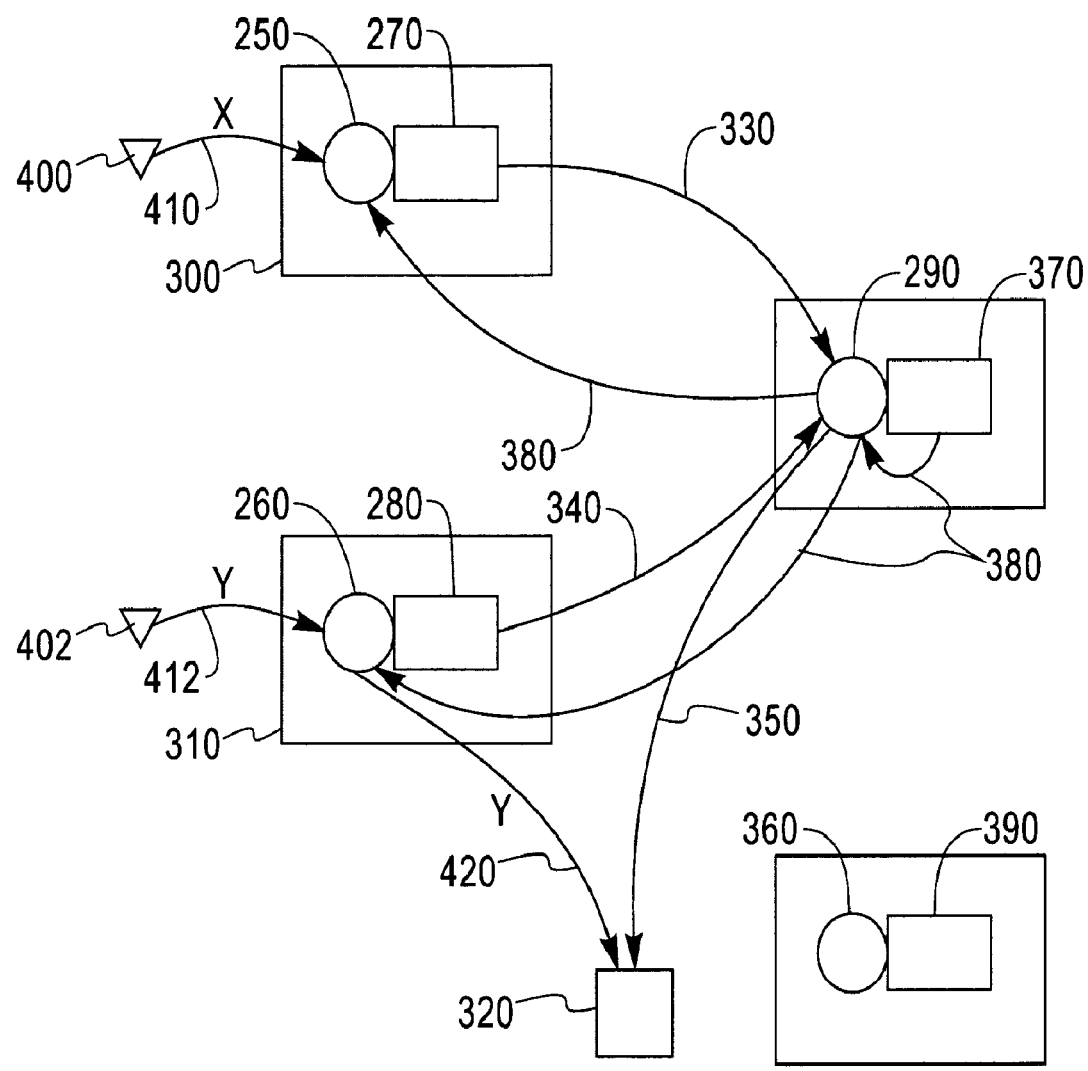
FIG. 2 shows schematically the relationship between channels and meta-channels according to a preferred embodiment of the invention.

As illustrated in FIG. 2, each channel 250, 260 within the system 10 is associated with a channel controller 270, 280, which extracts control information about a channel 250, 260 and may publish it periodically to another channel e.g., 290. The channel controller may reside within the same process as the channel or within an entirely different process. A given process may contain one or more controllers for one or more channels, but preferably a channel controller 270, 280 resides on the same machine 300, 310 as the channel it controls (250, 260, respectively) to reduce the possibility of inconsistency within the system 10. A channel controller 270, 280 may determine which topics are available on its underlying channel 250, 260 either by using mechanisms in the underlying channel such as, for example, the offer list in the CORBA Notification Service, or by interacting with the channel as a normal subscriber, e.g., by sampling traffic.

As illustrated in FIG. 2, the invention uses one or more meta-channels 290 to facilitate the ability of a channel controller 270 to publish control information or control messages to other channels 260 in the network. A meta-channel 290 carries information about other channels 250, 260 and is similar to them in that it supports publish/subscribe interaction. A meta-channel 290 may carry only control information or it may also be simultaneously used for carrying normal data messages. Participants in the messaging system that are interested in producing or subscribing to data messages may first subscribe to a meta-channel. A consumer, (e.g., at edge server 320) may select control information using a standard subscription mechanism and may use the meta-channel 290 to determine the location of a channel where messages of a type the consumer is interested in are being produced, as will be described in further detail below. Producers such as channel controllers 270, 280 may publish channel description information 330, 340 on a meta-channel 290. In general, a producer, e.g., 320, may learn from a meta-channel 290 about other channels, e.g., 260, that are available for producing messages of a type that is of interest to the producer 320. A meta-channel 290 may therefore use publication/subscribe semantics to distribute control messages 350 about the state of data channels (e.g., 250, 260).

Depending on the distributed system in which the invention is implemented, more than one meta-channel 290 may be used, i.e., meta-channels may be distributed across several entities in the system 10 and may prevent situations in which a single meta-channel becomes a bottleneck. If more than one meta-channel is used, each one may distribute control messages to each other using publication/subscribe messaging.

As used here, the word "type" or "topic" preferably refers to a kind of message or notification: it may refer to a keyword, subject, location, attribute, data source, role of a data provider, notification property or object, depending on the subscription scheme that is used, as will be recognized by those of ordinary skill in the art. According to a preferred embodiment of the invention, each message has a type that is identified by a simple string in order to allow the same mechanisms to be used to control channels that may be supported by different messaging technologies, even though the underlying technologies may support richer typing information. Message types identified by simple strings, for example, may be directly mapped to subjects on subject-based messaging systems. Accordingly, the invention does not require data channels 250, 260 and control channels (such as, e.g., meta-channel 290) to use the same messaging technology. For example, a data channel may use a messaging system that uses consumer semantics, so that its messages are retained until exactly one consumer receives messages from that data channel, while a mechanism such as a CORBA notification channel may be used to broadcast control information to many subscribers.

A channel controller (e.g., 280 may publish channel description information on a meta-channel 290. A channel description may contain information such as: the type of messaging system that is being used; information that is needed to connect to the channel 260 (e.g., address, port); the message type or types that the channel 260 accepts; the message type or types that are currently being published and subscribed to; the load and refresh rate (discussed in further detail below); etc. The channel description information can enhance the responsiveness and resiliency of the system in a number of ways.

For example, information in a channel description pertaining to the load on the channel may enable another entity in the system to discriminate between channels offering similar functionality. Load information may indicate, for instance, the number of subscribers and/or publishers that subscribe to and/or publish to the channel. Load information may be expressed in terms of memory usage, such as by indicating memory consumption as a percentage of the maximum memory, which may be calculated over a time window. In one scenario, a message-producing channel may be overloaded and may be able to communicate this fact to other entities via the load information in its channel description. A message consumer or publisher that receives the channel description may, upon learning of the heavy load, make the determination to subscribe or publish, respectively, to another channel that is experiencing a lighter load.

The refresh rate refers to a time period in between publications of a channel description. This time period may be used to help a message receiver determine whether a channel has failed. For example, a receiver might normally expect to receive a channel description every N seconds, where N is announced in the channel description as the refresh period or refresh rate. If the receiver does not receive a channel description in a time period that is proportional to the time period in the previously received channel description, then the receiver may infer that the channel has failed (i.e., if the receiver does not receive a channel description after, say, 2N seconds, the receiver may determine that the channel has failed).

The information in the channel description may be sent in the form of an electronic document, preferably in a standard format to facilitate the exchange of data across a variety of platforms, such as an eXtensible Markup Language (XML) document. XML is based on a well-documented standards-based technology defined by the World Wide Web Consortium (W3C). A standard format such as XML is preferred because it may be used even if producers and consumers in the distributed network use different publication/subscribe messaging technologies. Additional information may also be added to messages to aid filtering in specific technologies. For example, if channel descriptions contain information about the message types supported by the channels, then consumers may specify that they are interested only in information about channels carrying messages of a particular type. This could be accomplished, e.g., by adding the message types supported by a channel into the variable header part of a CORBA message. Alternatively, for example, if Java Message Service (JMS) messages are supported by a channel, the JMS message may include information about the message type(s) in the properties field. JMS is a specification for a common API for enterprise messaging. The JMS specification is available on the Web at http://www.java.sun.com. Java is a trademark of Sun Microsystems, Inc. in the United States and other countries. Those of ordinary skill in the art will recognize other ways of conveying message type information when using other publication/subscribe messaging technologies.

According to a preferred embodiment of the invention, the distributed messaging system 10 may employ more than one meta-channel 290 in order to aid in scalability and resiliency. Each meta-channel 290 has a meta-channel controller 370 to enable control information available on one meta-channel 290 to be communicated to other meta-channels 360. A meta-channel controller 370 may create a digest (not shown) about all the channel descriptions on the meta-channel 290 it controls and may publish the digest 380 on other meta-channels 360, including its own 290. The digest preferably contains a list of channel descriptions of data channels 250, 260 as well as a channel description of meta-channel 290.

Data message producers and consumers therefore need to subscribe only to control digests in order to obtain required information 380. Channel controllers 270, 280, for example, may use the digest as a confirmation that their control information 330, 340 is being read. They may also use digest information 380 pertaining to the meta-channel controller 370, such as the refresh period, to guide their behavior and/or the content of their own control messages 330, 340. If channel controllers 270, 280 use the refresh period from the channel description of the meta-channel controller 290 as a minimum for their own control messages, the meta-channel controller 290 can apply back pressure to the channel controllers 270, 280 to reduce their sending rate. For example, if channel 250 has a refresh rate of N seconds but learns via digest information 380 that the refresh period for meta-channel 290 is 3N seconds, channel controller 270 may adjust the refresh period for its channel 250 down to 3N seconds. Thus, the system 10 can adapt its responsiveness as a function of the load on the meta-channels (e.g., 290).

A channel controller 270 may also subscribe to the meta-channel 290 to learn about another, possibly more appropriate, meta-channel 360 for publication of its controller information 330. Another meta-channel controller 390 may subscribe to the meta-channel controller 370 to learn about other meta-channels in the system 10. All the entities in the system preferably use a softstate model, described in greater detail below, such that information is periodically refreshed.

The preferred subscription relationship between channels and meta-channels is now described in further detail with reference to FIG. 2. FIG. 2 demonstrates publishers such as sensors 400 and 402 publishing messages 410, 412 about events of type X and Y respectively, on channels 250 and 260, respectively. Channel controllers 270 and 280 report the events by publishing 330 and 340, respectively, on their associated meta-channel 290. Meta channel 290 may forward a digest of the event information 380 to other known meta-channels 360.

According to the illustration in FIG. 2, edge server 320 may contain a software platform on which another data channel or meta-channel runs, and/or it may forward data, after preprocessing and/or aggregating the data, toward another edge server or an application server (not shown). Edge server 320 subscribes to meta-channel 290 and thereby eventually learns about event type Y, of which edge server 320 has interest. Edge server 320 may then subscribe 420 to channel 260 to obtain updates on events of type Y.

Figure 3:
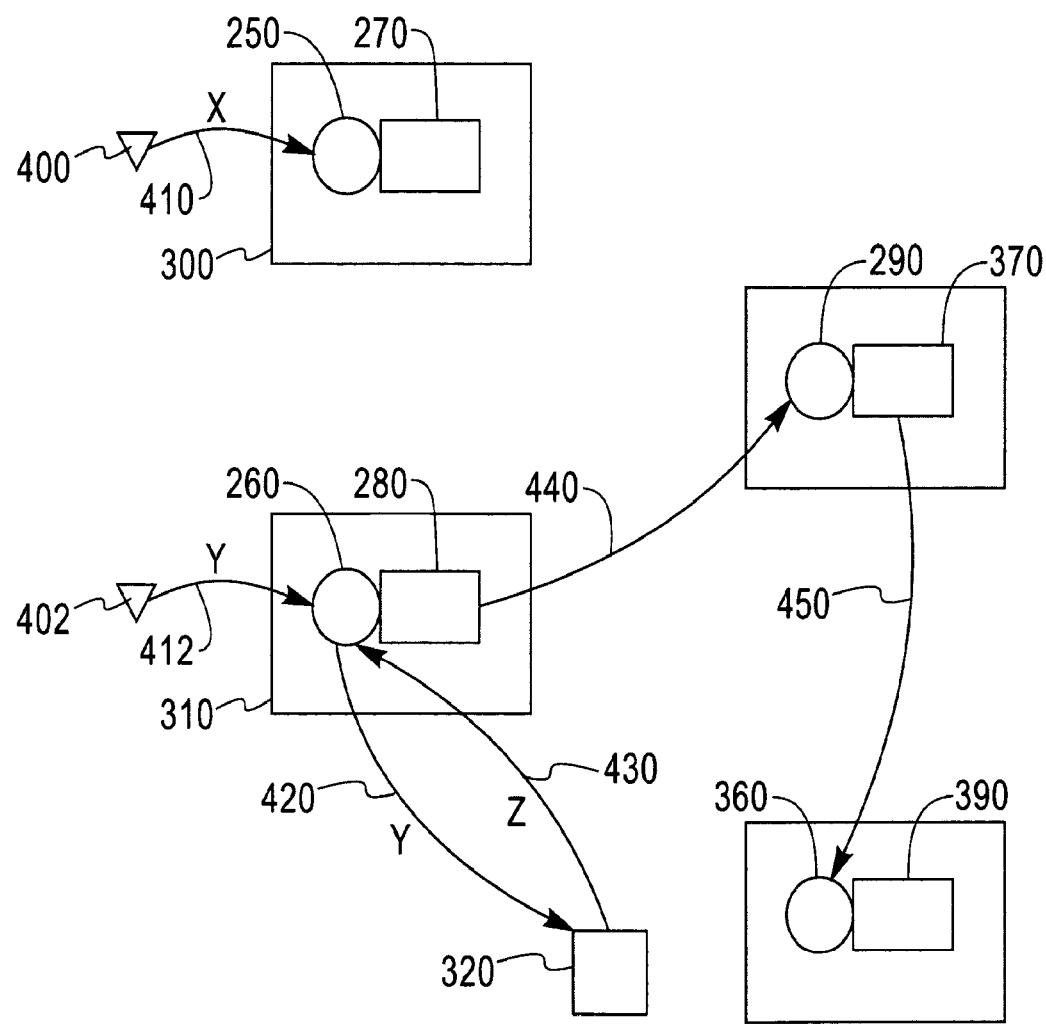
FIG. 3 is a schematic diagram illustrating the relationship between publishers and subscribers according to a preferred embodiment of the invention.

Application code running on edge server 320 may process data, including message data about event Y (420), to produce and publish messages about events of type Z (430), as further illustrated in FIG. 3. Messages about events of type Z may be aggregations or transformations of data received at edge server 320. If events of type Z are published 430 to channel 260, the associated channel controller 280 may update and publish its channel description 440 on meta-channel 290. Meta-channel controller 370 may forward this information 450 to other meta-channels 360.

Edge server 320 may thus consume messages from publishers such as sensors or other edge servers, which may function as data channels or meta-channels. In addition, an edge server 320 may use message data (e.g., 420) to produce new messages 430, as described above with respect to FIG. 3, which the edge server 320 may make available to other edge servers or to an application server. For example, an edge server may take a set of messages containing information about temperature measured at sensors in order to produce an aggregated message containing an average temperature. Alternatively, an edge server may process raw data by transforming or enriching it. For example, edge server 320 may receive one or more messages containing global positioning system (GPS) data and may transform the GPS data into a location on a map, e.g. a street name. The map is an example of a message transformation that the edge server 320 may then publish in the form of a new message.

An edge server 320 may learn from a meta-channel 290 about channels (e.g., 250, 260) on which information of interest to it is currently available, as described above with respect to FIG. 2. The edge server 320 may make local decisions based on currently available information (e.g., 350) about available resources, to determine from what subset of the available channels the edge server 320 should consume messages. Similarly, edge server 320 may determine locally to which channels (e.g., 260) it should place new messages that result from preprocessing performed at the edge server 320. Decisions made at the edge server 320 may change over time as channels (e.g., 250, 260) come and go and as resource usage fluctuates. The edge server 320 may produce aggregated messages which in turn may be further processed to produce even more aggregated messages. According to a preferred embodiment of the invention, multiple different messaging technologies may co-exist within one system, as messages may be read or received according to one messaging scheme and may be processed, aggregated and sent out according to a different mechanism.

An important aspect of the invention is to allow entities (such as edge server 320) of the messaging system 10 to dynamically determine where they should subscribe in order to receive the most aggregated form of a notification. Thus, the invention enables message consumers to learn (i) where messages of a given type are being produced, (ii) whether these messages have already been transformed or produced to a more aggregated form, and (iii) if so, to where the transformed or aggregated messages are being published. To accomplish the above, message consumers must be able to track the evolution of these message transformations as they change over time.

Thus, according to a key aspect of the invention, an entity such as an edge server may consume messages from a channel or set of channels and use the messages to produce new messages that it may send to another channel or set of channels. The edge server preferably publishes this information to a meta-channel using a transformation description message. That is, the edge server publishes the fact that it is subscribing to notifications about a topic on one channel and is using the notification information to produce notifications about another topic on potentially another channel, as will be described in further detail below with regard to FIG. 4.

The transformation description message containing this information is preferably treated as a softstate model, i.e., the information must be refreshed regularly, or it will expire. The transformation description message is similar to the channel description message described above, in that it is preferably an XML document, and it may provide information including: (i) a set of channel name and message-type pairs for all the messages that the edge server 320 is reading; (ii) a set of channel name and message-type pairs for all the messages that the edge server 320 is writing; (iii) a refresh period; etc. Additional tags may also be added to the technology specific message format in which the XML document is being transported to aid in filtering.

Advantageously, a message consumer may subscribe to a meta-channel to receive information, not only about the channels on which messages of a given type are being published, but also about any transformations of those messages. Also, a message publisher such as an edge server may produce multiple aggregated or transformed messages from the same input: for example, an edge server may produce a message containing an average of a set of temperature readings and may produce another message containing the range of a set of temperature readings.

A non-limiting example of the way in which message transformations may be tracked is now described with reference to FIG. 4. FIG. 4 describes an example application in which the invention may be used to help in the monitoring of temperature data detected by sensors 500, 502 located in a particular environment in order to determine, say, an average temperature.

As depicted in FIG. 4A, sensors 500, 502 send one or more temperature readings 510, 512 to Channel 1 (550), which sends control information 560 about the temperature data to which it subscribes to meta-channel 590.

FIG. 4B illustrates meta-channel 590 sending control information 600 to an application server or edge server 610, which subscribes to meta-channel 590 in order to learn about other channels in the system 10. Application server 610, which has the task of determining an average of the temperatures detected by sensors 500, 502, subscribes 620 to Channel 1 (550). Not shown is the fact that application server 610 may also be subscribing to many other channels to receive raw temperature data, in order to be able to determine an average temperature detected by many sensors.

As shown in FIG. 4C, another application server or edge server 630 subscribes 640 to Channel 1 (550) to obtain temperature data 510, 512. Application server 630 also receives other temperature data (not shown) from other sensors or channels in the system 10 and computes an average temperature based on the temperature from Channel 1 (550) and from other temperature data producers. Application server 630 then publishes the average temperature 650 to Channel 2 (660). The average temperature represents a message transformation, i.e., a message about data that has been aggregated or transformed based on raw data received from one or more entities within the system.

Application server 630 also publishes a transformation description message in the form of control information 670 to meta-channel 590, as illustrated schematically in FIG. 4D. Control information 670 includes: (i) a description of the events to which application server 630 subscribes (such as temperature data from Channel 1), and (ii) a notification that application server 630 is publishing (650) aggregated temperature data to Channel 2 (660). Channel 2 (660) is capable of storing the average temperature in memory and is also capable of publishing the average temperature. Meta-channel 590 publishes another control message (e.g., 600) to its subscribers, including application server 610. As a result of receiving this control information or transformation information 600, application server 610 is now aware that Channel 2 (660) publishes the average temperature. Application server 610 drops the subscription 620 to Channel 1 (550) and subscribes 670 to Channel 2 (660).

Not shown is the fact that application server 610 may now drop a number of other subscriptions it may have had with other publishers, because now application server 610 can obtain aggregated data from a single producer, 660. Application server may also further process the aggregated data, by enriching or transforming it, and may publish the further message transformations on one or more other channels. Also, additional channels may further aggregate or process the message transformations (such as the average temperature in the above example) that are available at Channel 2 (660) and/or application server 630.

Control information may be refreshed periodically so that updated information becomes available as data changes or as entities stop or start interacting within the messaging system. Therefore, as discussed above, channel controllers and meta-channel controllers may publish in their summary descriptions the refresh rates at which control data should be resent. Publication of these refresh periods allows the controllers to apply back pressure to prevent channels within the system from becoming clogged or overburdened with control information. A frequent refresh rate may be desirable in order to improve the reactivity of the system in response to change. This objective, however, should be weighed against the higher control overhead that accompanies a higher refresh rate. Thus, for example, for some applications a refresh period on the order of many seconds may be preferable in order to reduce effects of queuing and/or propagation delays.

It is to be appreciated that the term "processor" as used herein is intended to include any processing device, such as, for example, one that includes a CPU (central processing unit). The term "memory" as used herein is intended to include memory associated with a processor or CPU, such as, for example, RAM, ROM, a fixed memory device (e.g., hard drive), a removable memory device (e.g., diskette), etc. It is also to be understood that various elements associated with a processor may be shared by other processors. Accordingly, software components including instructions or code for performing the methodologies of the invention, as described herein, may be stored in one or more of the associated memory devices (e.g., ROM, fixed or removable memory) and, when ready to be utilized, loaded in part or in whole (e.g., into RAM) and executed by a CPU.

The methods in accordance with the present invention may therefore be implemented at least partially using software, e.g., computer programs and the invention may provide computer software specifically adapted to carry out the methods described above when installed on data processing means. The present invention may be embodied as a computer program product for use with a computer system. Such an implementation may comprise a series of computer readable instructions either fixed on a tangible medium, such as a computer readable medium, or transmittable to a computer system, via a modem or other interface device, over either a tangible medium such as optical or analogue communications lines, or intangibly using wireless transmission techniques. The series of computer readable instructions embodies all or part of the functionality previously described herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

The invention claimed is:

1. A method for tracking notification messages from a message publisher to a message subscriber, in a publish/subscribe system having one or more entities each configured as one or more of a message publisher, a channel and a message subscriber, the method comprising:

subscribing to a meta-channel, said meta-channel receiving descriptions of one or more associated channels, each said channel description indicating how notifications are presented by a publisher, or aggregated or transformed by a publisher so as to supercede notifications received by the publisher acting as a subscriber and thereby reduce a load upon the system, so that a subscriber to a channel having aggregated or transformed notifications receives the aggregation or transformation rather than the superceded notifications, the aggregation or transformation then becoming incorporated into subsequent notifications when the subscriber is configured as a publisher after having further aggregated or transformed what has been received from the channel;

receiving a digest of said channel descriptions from said meta-channel, said digest indicating how notifications are superceded thereby enabling a subscriber or a publisher, respectively, to discriminate between channels and to switch to channels providing superceding notifications based on said discrimination, wherein said switching of channels based on said discrimination serves to automatically reconfigure said publish/subscribe system in response to overloading or failure of one or more channels in said system;

receiving a digest of one or more transformation description messages from said meta-channel, said digest enabling a subscriber to track evolution of message transformations from raw forms to processed forms and to switch publishers based on said tracking, the evolution progressing from superceded to superceding notifications; and using said transformation description messages to track said evolution of message transformations in order to determine where to subscribe.

2. The method of claim 1, further comprising: subscribing to a first channel in response to the tracking of message transformations; and dropping a subscription to a second channel in response to determining that the first channel publishes one or more notifications in a more processed form than a notification from the second channel.

3. The method of claim 1, wherein the message transformations in processed form comprise aggregations of messages in raw form.

4. The method of claim 1, wherein the message transformations in processed form comprise transformations of messages in raw form.

5. The method of claim 1, further comprising publishing aggregated notifications.

6. The method of claim 1, further comprising publishing transformed notifications.

7. The method of claim 1, wherein the message transformations are formatted in accordance with XML specifications.

8. The method of claim 1, wherein the digest of said channel descriptions describes one or more of a channel and the meta-channel.

9. The method of claim 1, wherein each of the one or more channel descriptions comprises one or more of: the publish/subscribe system's type; information needed to connect to a channel associated with the channel description; one or more message types that is accepted by the channel associated with the channel description; and one or more message types that is currently being published or subscribed to by the channel associated with the channel description.

10. The method of claim 1, wherein each of the one or more channel descriptions comprises load information pertaining to the channel associated with the channel description.

11. The method of claim 10, further comprising: in response to the load information, discriminating between first and second channels offering similar functionality.

12. The method of claim 11, further comprising: subscribing to the first channel in response to determining that the second channel is overloaded.

13. The method of claim 11, further comprising: publishing to the first channel in response to determining that the second channel is overloaded.

14. The method of claim 1, wherein each of the one or more channel descriptions comprises information pertaining to a refresh period between a publication of a first channel description and a publication of a second channel description.

15. The method of claim 14, further comprising: in response to the information pertaining to the refresh period, and in response to nonreception of a second channel description after a time period proportional to the refresh period, determining that a channel has stopped publishing notifications.

16. The method of claim 15, further comprising adjusting a refresh period for a channel in response to information pertaining to a refresh period for the meta-channel.

17. The method of claim 1, wherein the transformation description message pertaining to an entity comprises one or more of: information identifying a set of channels and message types for messages that the entity is reading; information identifying a set of channels and message types for messages that the entity is writing; and a refresh period.

* * * * *